Sept. 27, 1966 R. E. VAR 3,275,745

THREE-DIMENSIONAL TELEVISION SYSTEM

Filed Dec. 23, 1963 2 Sheets-Sheet 1

INVENTOR.

BY ROBERT E. VAR

Sept. 27, 1966 R. E. VAR 3,275,745

THREE-DIMENSIONAL TELEVISION SYSTEM

Filed Dec. 23, 1963 2 Sheets-Sheet 2

INVENTOR.

BY ROBERT E. VAR

United States Patent Office 3,275,745

Patented Sept. 27, 1966

3,275,745

THREE-DIMENSIONAL TELEVISION SYSTEM

Robert E. Var, 216 Emerald Ave., New Brighton, Minn.

Filed Dec. 23, 1963, Ser. No. 332,342
6 Claims. (Cl. 178—6.5)

The present invention relates to communication equipment and more particularly to a three-dimensional television system.

Briefly stated, a preferred form of the present invention provides a three-dimensional television system with a first polarizing means at the television picture tube for polarizing the light from portions of the picture displayed on the tube in different planes and a second polarizing means for polarizing light in a different plane for each eye of the viewer so that one eye of the viewer can observe one picture while the other eye observes a different picture. In a specific form of the invention, a right and left camera are provided for convenience hereinafter referred to as camera L and camera R and a logic circuit means is provided for distinguishing between the transmission fields produced by each camera and for blanking out the signal from alternate cameras in a timed sequence corresponding to the presentation of the separate transmission fields.

One object of the invention is the provision of an improved three-dimensional television transmission system which will require little modification of existing television transmitters and receivers.

Another object of the invention is the provision of an improved three-dimensional television transmission system which will provide three-dimensional detail in both black and white or color from closed circuit or open circuit television broadcasts.

Another object of the invention is the provision of an improved three-dimensional television transmission system which can function as either a three-dimensional system or a two-dimensional system.

Another object is the provision of an improved three-dimensional television transmission system which will broadcast two different pictures of the scene being televised in alternate sequence and in which each picture comes from a different camera, the cameras being separated at an appropriate horizontal distance such that the picture which comes from the camera corresponding in position to an observer's right eye is scanned, transmitted and displayed on the television receiver during a first time interval by the scanning lines which are customarily referred to as the field A synchronization pulses (or the even numbered lines) while the picture which comes from the camera corresponding in position to an observer's left eye is scanned, transmitted and displayed on the television receiver during the next time interval by means of the scanning lines which are customarily referred to as the field B synchronization pulses (the odd numbered lines) and including a receiver having a plurality of polarizing strips positioned in alignment with the odd and even numbered lines at the kinescope tube and bearing a polarizing material oriented in different planes and a discriminating means to be used by the observer including a polarizing sheet for each eye.

Yet another object of the invention is the provision of an improved three-dimensional television transmission system including a synchronization and gating circuit means which will serve to distinguish between the field A synchronization pulses and the field B synchronization pulses and will produce pulses responsive thereto for blanking the output of the video amplifier of the left camera when the synchronization pulses of field A are being generated and will blank the output from the video amplifier of the right camera when the synchronization pulses of field B are being generated thereby assuring that the field A synchronization pulses are always associated with the output of the right camera for example and the field B synchronization pulses are always associated with the output of the left camera for example.

Another object of the invention is the provision of an improved three-dimensional television transmission system including means insuring that the television receiver will not require adjustment for vertical position of the image between different stations or when different three-dimensional television camera sets are used on the same program.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which.

The invention will be best understood by reference to the following description and accompanying figures wherein the same numerals refer to corresponding parts in the several views.

Figures 1, 2, 3, 4, 5:
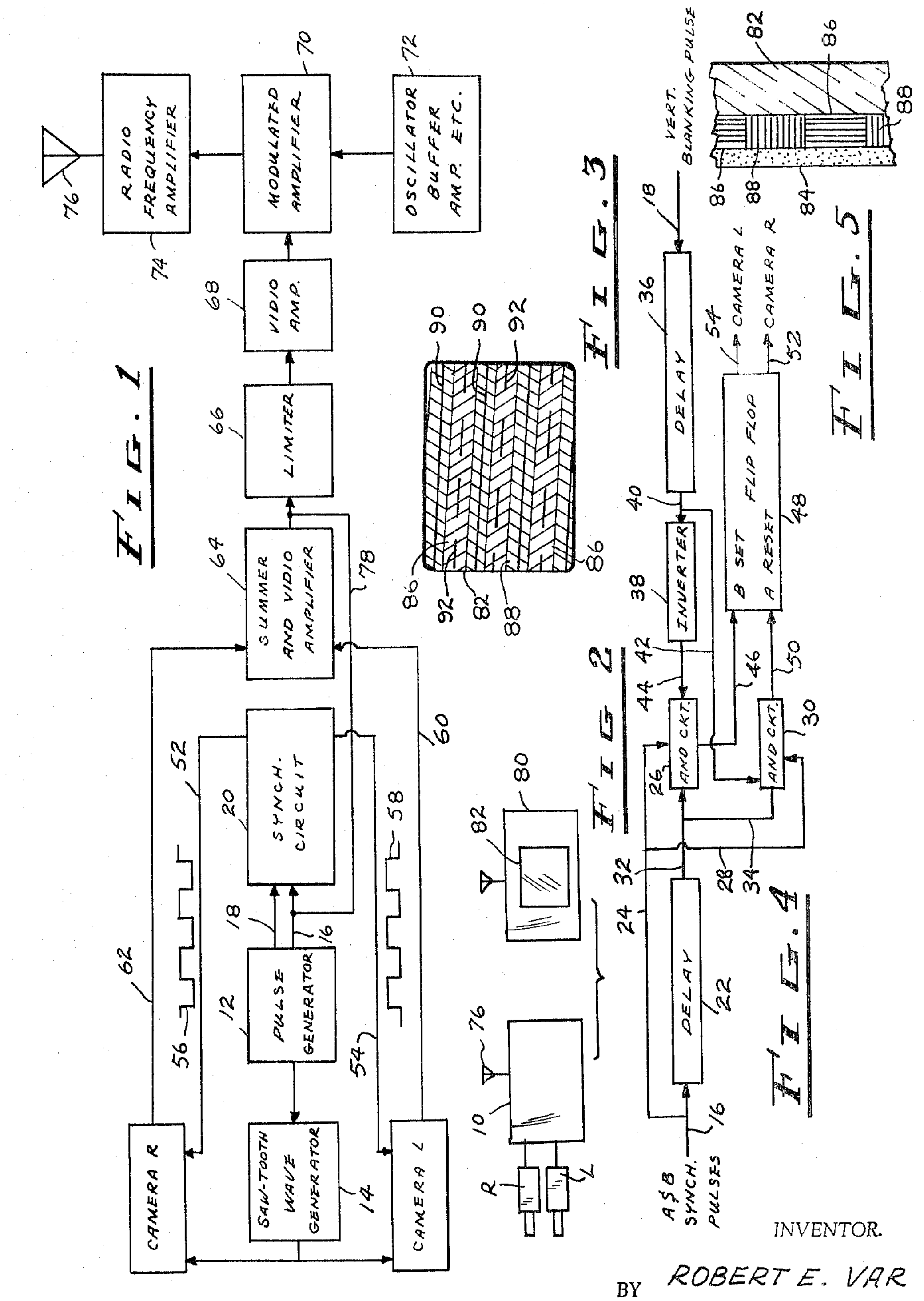
FIGURE 1 is a block diagram illustrating the broadcasting transmission system in accordance with the present invention.
FIGURE 2 is a diagrammatic illustration of the camera and receiver in accordance with the present invention.
FIGURE 3 is a diagrammatic illustration of the face of the kinescope tube in accordance with the present invention.
FIGURE 4 is a block diagram of the preferred form of synchronization circuit of FIGURE 1.
FIGURE 5 is a partial vertical longitudinal sectional view taken through the kinescope tube in accordance of one preferred form of the present invention.

As can be seen in FIGURES 1 and 2, two image receiving means are provided including two separate lenses and scanners. These receiving means are designated camera L and camera R. The cameras L and R are coupled to a transmitter 10 to be described hereinbelow.

The transmitter 10 includes an oscillator means including a pulse generator 12 of a suitable known construction the output of which is fed to a saw-tooth wave generator 14, the output of the saw-tooth wave generator 14 in turn being fed to the cameras L and R. The output of the pulse generator 12 is also fed to a synchronization circuit through a line 16. A vertical blanking pulse to be described more fully hereinbelow which is also produced by the pulse generator 12 is fed to the synchronization circuit through a line 18.

The synchronization circuit designated 20 as shown in FIGURE 4, includes a delay means 22 which preferably functions to delay the signal from the line 16 on the order of 32 microseconds. The signal from line 16 is also fed through a line 24 to an and circuit 26 and through a line 28 to a second and circuit 30. The output from the delay 22 is fed to the and circuit 26 through a line 32 and to the and circuit 30 through a line 34. The vertical blanking pulse which is sent from the pulse generator through the line 18 to the synchronization circuit is fed to a delay 36 and the output of the delay 36 is fed to an inverter 38 through a line 40 and to the and circuit 30 through a line 42. While the delay 36 can be varied in time, it is preferably on the order of 16 microseconds. The output of the inverter 38 is fed through a line 44 to the and circuit 26. The output of the and circuit 26 passes through a line 46 to a flip-flop 48 and the output of the and circuit 30 passes through a line 50 to the flip-flop 48. As illustrated in FIGURE 4, the flip-flop will be set by the signal through line 46 and it will be reset by the signal through line 50 for field A. The output of the flip-flop 48 passes through a conductor 52 to the camera R and through a conductor 54 to the camera L. The relative position of the blanking pulses passing through the conductors 52 and 54 have been illustrated at 56 and 58 respectively so that the alternate sequence of their respective pulses can be clearly seen.

The conductors 52 and 54 are wired to blanking amplifiers of a suitable known construction (not shown) within the respective cameras R and L for extinguishing the output signal of each camera in alternate sequence. The outputs of the cameras L and R are fed through conductors 60 and 62 respectively to a summer and video amplifier 64. The output of the summer and video amplifier is fed to a limiter 66 thence to a video amplifier 68 and to a modulated amplifier 70. The output of an oscillator buffer amplifier and related apparatus 72 is also fed to the modulated amplifier 70 in a conventional and well known manner. The output of the modulated amplifier 70 is fed to a radio frequency amplifier 74 in the usual manner then to an aerial 76. The field A and field B synchronization pulses which are fed through the line 16 are also fed through a line 78 to the limiter 66 conventionally.

As can be best seen in FIGURES 2, 3 and 5 a receiver 80 includes a picture tube or kinescope 82 having phosphorescent coating 84 therein and a masking means composed of a polarizing and optically transparent material such as that sold under the registered trademark "Polaroid" in the form of strips 86 polarized along a first axis, for example, vertical, alternating with strips 88 which are polarized along a different axis, for example, horizontal. The masking strips 86 and 88 are of an appropriate vertical thickness to exactly match the spacing between the field A scanning lines 90 and the field B scanning lines 92. As can be clearly seen in FIGURE 3, the polarizing strips 86 all overlie the field B scanning lines 92 while the strips 88 all overlie the field A scanning lines 90.

Figures 6, 7, 8:
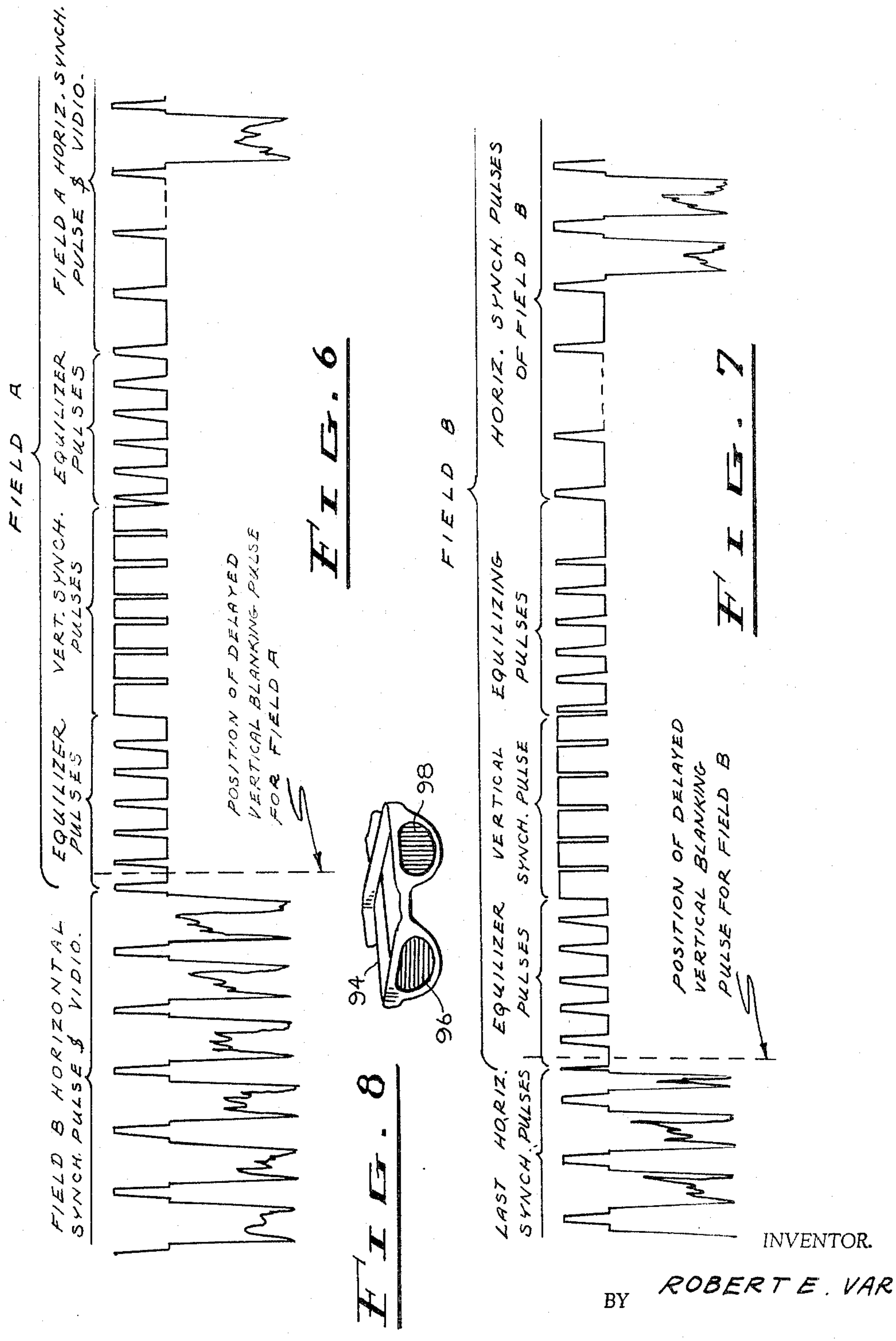
FIGURE 6 is a semidiagrammatic graph illustrating a portion of the transmission signal and blanking pulse for field A.
FIGURE 7 is a graph similar to and in sequence with FIGURE 6 illustrating the blanking pulse for field B.
FIGURE 8 is a perspective view of a pair of polarizing glasses to be used with the present invention.

As shown in FIGURE 8, a discriminating means such as a pair of glasses 94 including an optical transparent polarizing substance such as polaroid sheets 96 and 98 is provided for the viewer. The sheet 98 is polarized in a first plane for example vertical while the sheet 96 is polarized in a different plane for example at right angles to the polarization of the sheet 96, i.e., horizontal.

The operation of the apparatus takes place in the following manner. The master oscillator and pulse generator 12 generates the synchronization pulses which pass through the conductor 16 and also to the scanning apparatus within the cameras L and R. The master oscillator and pulse generator 12 drives the scanners of both cameras simultaneously through a mechanism of conventional and well known construction (not shown) so that the odd numbered lines associated with both cameras are scanned simultaneously in $\frac{1}{60}$ of a second and the even numbered lines associated with both cameras are scanned simultaneously in the next $\frac{1}{60}$ of a second. In operation, the odd numbered lines scanned by camera L are made to coincide in the vertical direction with imaginary lines located midway between the even numbered lines scanned by camera R in a conventional and well known manner. In accordance with the present invention, both cameras R and L will be scanning all of the lines as in normal 2D television but a switching means to be described hereinbelow and which preferably operates sixty times a second will select the output from the cameras L and R alternately so that the output from camera R contains only the even numbered lines while the output from camera L contains only the odd numbered lines. Normal 2D telecasting can be restored by simply throwing a switch (not shown) which disconnects the output from the camera L and the blanking pulse to the camera R so that the output 62 from camera R contains both the even and odd numbered lines in the conventional manner for two-dimensional television.

While the vertical blanking pulse is employed for distinguishing between field A and field B, other pulses present such as the keying pulse can be used for this purpose if desired.

As can be seen in FIGURES 1 and 4, the synchronization circuit 20 will function to insure that the camera R always presents only the even numbered lines as the output and that the camera L always presents only odd numbered lines as an output. Thus, once the three-dimensional receiver is adjusted so that the even numbered lines (field A) lie behind the horizontal polarized strips, for example, it should not have to be adjusted again for different three-dimensional programs, coming from different stations. Accordingly, the blanking pulses which are fed through the line to camera R each lasts for a period of $\frac{1}{60}$ of a second and each is separated from the next by a period of $\frac{1}{60}$ of a second during which the blanking pulses pass through the line 54 to the camera L. In this manner, the field A (even numbered lines as seen in FIGURE 3) is made to originate from only one of the cameras while the field B (odd numbered lines) originates from the other camera. The mechanism which associates one camera with a particular field at all times will now be described.

As can be seen in FIGURES 6 and 7, there is a slightly different relationship between the last of the horizontal sync pulses for field B and the equalizer pulses which follow than between the last of the field A horizontal sync pulses and the following equalizer pulses. Specifically, the first of the equalizer pulses of field B follow the last of the field A horizontal sync pulses by an interval equal to one-half the time period between the last of the field B horizontal sync pulses and the first equalizer pulses of field A. This relationship determines when the vertical sweep will start relative to the start of the horizontal sweep in each field. A comparison between the sync pulses generated for field A and field B shows that relative to the last horizontal sync pulse, the vertical blanking pulse for field B will always start ½ line width sooner than the vertical blanking pulse for field A. In both cases, however, the vertical blanking pulse starts at the same time as the first equalizing pulse.

As can be clearly seen in FIGURE 4, in accordance with the present invention the vertical blanking pulse is delayed. While the delay time may vary, it will preferably be on the order of 16 microseconds at the delay unit 36. Further in accordance with the invention the A and B sync pulses which pass through the line 16 are delayed at 22 for a greater duration of time, preferably on the order of one-half the time interval between the horizontal sync pulses, in practice on the order of 31.75 microseconds. In this manner, the logic circuit of FIGURE 4 will function to distinguish between the sync pulses which produce field A from those which produce field B. This is accomplished by the provisions of the and circuits 26 and 30 for recognizing that the first time a successive sync pulse occurs in a time equal to one-half the duration of the horizontal sync pulse interval there will be present simultaneously the delayed vertical blanking pulse only when field A is going to be scanned. When field B is going to be scanned, the delayed vertical blanking pulse will not be simultaneously present with the second sync pulse which occurs after the last sync pulse at an interval of one-half the duration between horizontal sync pulses. Thus, when there is no pulse at the input 40 to the inverter 38, the output 44 of the inverter will be equivalent to a pulse which is fed to the and circuit 26 and if there is also present simultaneously a signal from the delay 22 and through line 24, the pulses will pass through line 46 to the flip-flop 48 which causes the output consisting of a blanking gate on line 54 to camera L. On the other hand, when a pulse passes through the line 42 to the and circuit 30 and through both of lines 28 and 34 to the and circuit 30, a pulse will pass through the line 50 to the flip-flop 48 so as to initiate a pulse which will cause a blanking gate to appear on line 52 to the R camera and no blanking gate to be present on line 54 to the L camera. Under these conditions, of course, the pulses impressed on the and circuit 26 will cause no output through the line 46.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A three-dimensional television transmission system comprising in combination a first and second television camera, each of the cameras being adapted to produce a transmission field A and a transmission field B, a receiver operatively associated with the transmitter cameras for displaying the field A transmission and the field B transmission as alternate horizontally disposed lines, a pulse generating means for blanking the transmission of one of the cameras during the time one of said fields is transmitted and for blanking the transmission of the other of said cameras when the other of said field is being transmitted, a plurality of polarizing means overlying the said horizontal lines, the polarizing means overlying one of the horizontal lines of one of said fields being polarized in a first plane and the polarizing means overlying the horizontal lines of the other said field being polarized in a different plane, and a discriminator including first and second polarizing means adapted to be placed adjacent to the right and left eye of the observer and said discriminating means, said polarizing means also being positioned to pass only light which is polarized in specific planes, whereby the light passing through the polarizing means for the left eye will arise from the said lines of one field and the light passing through the polarizing means for the right eye will arise from the horizontal lines of the other field, said transmitter including a pulse generator for generating sync pulses for field A and field B and for generating a vertical blanking pulse, a means for delaying the vertical blanking pulse for a relatively short period of time, a means for delaying the field A and field B sync pulses on the order of twice the length of time that the vertical blanking pulse is delayed, an inverting means for reversing the polarity of the delayed vertical blanking pulse, a first and circuit, a means for feeding the inverted signal to said and circuit, a means for feeding the delayed sync pulses to said first and circuit, a means for feeding said A and B sync pulses to said and circuit without passing through said delay, a flip-flop means wired to the output of the first and circuit for transmitting a blanking impulse to a predetermined camera responsive to an output pulse from said first and circuit, a second and circuit, a means for impressing the delayed vertical blanking pulse upon said second and circuit, a means for impressing the delayed A and B sync pulses upon said second and circuit, a means for impressing the A and B sync pulses upon the second and circuit without said delay and a means for impressing output of the second and circuit to the flip-flop for transmitting blanking pulses to the blanking gate of the other of said cameras in response thereto.

2. A three-dimensional television transmission system comprising in combination a right and a left television camera, a circuit means wired to each of said cameras, each of said cameras being adapted to produce an A and B transmission field, said circuit means being adapted to distinguish between the A and B transmission fields produced by each camera and means for blanking out the signal from each camera in alternate sequence corresponding to the presentation of the respective transmission fields whereby one camera transmits only field A and the other only field B and a picture tube with a first polarizing means for polarizing the light in different planes from portions of the picture displayed on the tube and a second polarizing means for polarizing light in a different plane for each eye of the viewer.

3. In a three-dimensional television transmission system having a first television camera adapted to transmit a transmission signal associated with a field A and a second television camera adapted to transmit a transmission signal associated with a field B interlaced with said field A, each of said transmission signals A and B having horizontal synchronization pulses, vertical blanking pulse and equalizer pulses; the improvement comprising comparing successive pulses, sensing the first of said pulses to occur which is spaced in time by about one-half the normal line width interval from the preceding pulse, comparing the signal thus sensed with the vertical blanking pulse such that the beginning of the field A transmission signals are sensed and used to blank out the camera associated with only the field B transmission signals and the beginning of the field B transmission signals are sensed and used to blank out the camera associated with only the field A transmission signals.

4. The combination of claim 3 wherein said vertical blanking pulse is delayed by a time interval equal to about one-fourth the normal line width and wherein a means is provided for comparing the delayed vertical blanking pulse with the first of said signals to occur at a time interval of about one-half the normal line width from the preceding pulse.

5. In a three-dimensional television transmission system having a pair of cameras adapted to transmit interlaced transmission signals A and B, each of said transmission signals having horizontal synchronization pulses, a vertical blanking pulse and equalizer pulses, the improvement comprising: means for delaying said synchronization pulses, means for delaying said equalizer pulses, means for delaying the vertical blanking pulse, a means for comparing successive delayed horizontal synchronization pulses and equalizer pulses with undelayed horizontal synchronization pulses and equalizer pulses, means to generate a resultant signal when two of said pulses occur successively in a time interval of half the interval between the horizontal synchronization pulses, comparing said resultant signal with said delayed vertical blanking pulse such that the beginning of field A transmission pulses and field B transmission pulses are detected and used to blank out the camera associated with the opposite transmission field of the one thus sensed.

6. A three-dimensional television transmission system comprising in combination a pair of horizontally spaced apart television cameras, a means for blanking the output of each camera at timed intervals in alternate succession, a receiver, a means for transmitting the alternate signals from the cameras to the receiver, said receiver including a cathode ray tube for displaying said signals in alternate time sequence and in spaced relationship and a mask formed from a plurality of strips of a transparent polarizing material positioned to rest in alignment with the respective signals thus displayed on the cathode ray tube, logic circuit means distinguishing the transmission field of one camera from the transmission field of the other camera, and means for blanking the output of said one camera only when a selected one of said fields is transmitted by said one camera.

References Cited by the Examiner

UNITED STATES PATENTS

| | | | |
|---|---|---|---|
| 2,301,524 | 11/1942 | Carnahan | 178—6.5 |
| 2,578,298 | 12/1951 | Goldsmith | 178—6.5 |

DAVID G. REDINBAUGH, *Primary Examiner.*

R. L. RICHARDSON, *Assistant Examiner.*